(12) United States Patent
De'Longhi

(10) Patent No.: US 8,723,084 B2
(45) Date of Patent: May 13, 2014

(54) HOUSEHOLD APPLIANCE FOR THE PRODUCTION OF BREAD

(75) Inventor: Giuseppe De'Longhi, Treviso (IT)

(73) Assignee: De'Longhi Appliances S.R.L., Treviso (IT)

( * ) Notice: Subject to any disclaimer, the term of this patent is extended or adjusted under 35 U.S.C. 154(b) by 4 days.

(21) Appl. No.: 13/146,184

(22) PCT Filed: Mar. 16, 2010

(86) PCT No.: PCT/EP2010/053404
§ 371 (c)(1),
(2), (4) Date: Jul. 25, 2011

(87) PCT Pub. No.: WO2010/108827
PCT Pub. Date: Sep. 30, 2010

(65) Prior Publication Data
US 2012/0000900 A1 Jan. 5, 2012

(30) Foreign Application Priority Data
Mar. 24, 2009 (IT) .............................. MI2009A0465

(51) Int. Cl.
*A21B 1/00* (2006.01)
*A47J 27/62* (2006.01)

(52) U.S. Cl.
USPC ........... 219/393; 219/391; 219/386; 219/387; 99/327; 99/348; 99/357; 99/476; 99/331; 126/21 A; 126/21 R

(58) Field of Classification Search
USPC ........ 219/393, 391, 386–7; 99/327, 348, 357, 99/476, 331–2; 126/121 A, 214
See application file for complete search history.

(56) References Cited

U.S. PATENT DOCUMENTS 5,878,655 A * 3/1999 Chan ............................... 99/327
6,321,641 B1 11/2001 Wang

FOREIGN PATENT DOCUMENTS

EP 070924 A 5/1996
EP 0709024 * 5/1996

OTHER PUBLICATIONS

International Search Report of PCT/EP2010/053404 dated Jun. 17, 2010.
Written Opinion of the International Searching Authority of PCT/EP2010/053404 dated Jun. 17, 2010.

* cited by examiner

*Primary Examiner* — Shawntina Fuqua
(74) *Attorney, Agent, or Firm* — Amster, Rothstein & Ebenstein LLP

(57) ABSTRACT

The household appliance (1) for the production of bread comprises—a cooking chamber (11), —electrical supply means (19) for heating said cooking chamber (11), —a drive means ((12) pivotally activated in said cooking chamber (11) by a geared motor (13), —a container (10) which can be accommodated in said cooking chamber (11) and having at least a containment chamber (2) for the bread and at least a mixing shovel (3) positioned inside said containment chamber (2) and able to be directly or indirectly moved by said drive means (12), said containment chamber (2) being so configured to have a first proportion ratio (R1) between every dimension (A, B, Φ) of its base and its height (H), and a second proportion ratio (R2) between the dimension of its height (H) and the length (L) of said shovel (3), said ratios being able to give to the cooked bread in said containment chamber (2) a mainly low and wide shape with a little crumb.

13 Claims, 6 Drawing Sheets

HOUSEHOLD APPLIANCE FOR THE PRODUCTION OF BREAD

The present invention relates to an household appliance for the production of bread.

Household appliances are known for producing bread with a container having one or more containment chambers for the bread, provided internally with a mixing shovel for kneading the bread before its cooking, which takes place in the same container where the mixing is performed.

All such household appliances have the problem of providing the bread in form of loaves, high and with much crumb.

To overcome such problem, it has been proposed to intervene in the production cycle of the bread, after the mixing stage and before the cooking stage, in order to manually shape the bread to obtain the desired forms.

However this expedient has the problem of not being able to allow a full automatic cycle for the production of bread.

The technical task of the present invention is therefore to provide a household appliance for the production of bread in order to avoid the technical problems lamented in the known art.

Within this technical task, a scope of the invention is to provide a household appliance for the production of bread having low and wide shapes with few soft parts.

Another scope of the invention is to provide a household appliance for the production of bread with a full automatic production cycle.

The technical task, as these and other tasks according to the present invention, are reached by providing a household appliance for the production of bread as in claim 1.

Other features of the present invention are further defined in the following claims.

Further features and advantages of the invention will be more evident from the description of a preferred but not exclusive embodiment of the household appliance for the production of bread according to the invention, illustrated in an indicative and not limiting form in the annexed drawings, in which.

Figure 1:
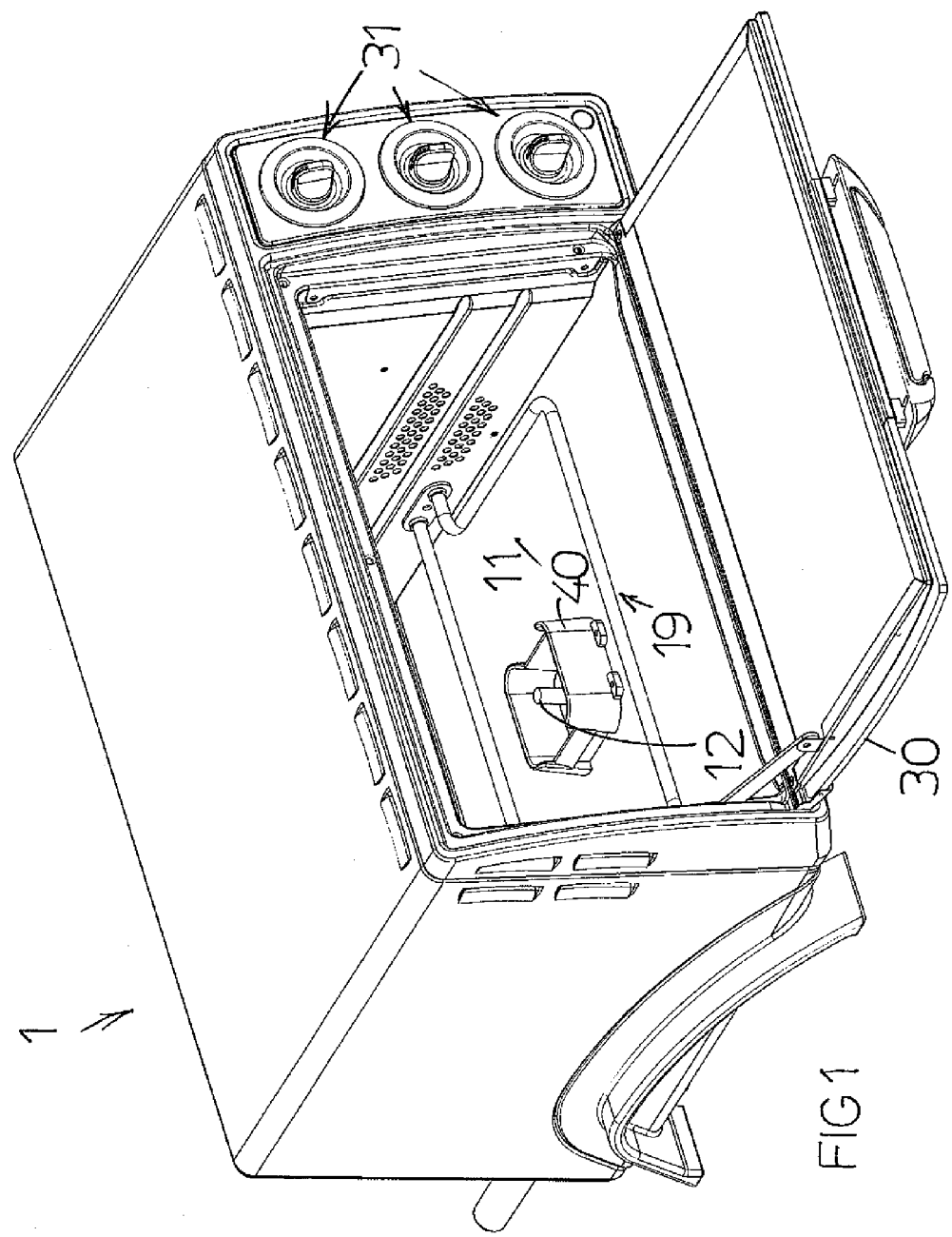
FIG. 1 shows a perspective view of a household appliance for the production of bread, without the container for the bread.

Referring to the above figures, a household appliance for the production of bread is shown, indicated as a whole with the reference character 1.

The household appliance comprises a cooking chamber 11 of the kind having electrical supply means 19 for its own heating.

The heating means 11 can comprise a first electric resistance disposed at the base and a second electric resistance disposed at the top of the cooking chamber 11.

Possibly, the household appliance 1 can also comprise other heating microwave means.

In the cooking chamber 11 also provided is a drive means 12 pivotally operated by means of a appropriate geared motor generally disposed under the base of the cooking chamber 11.

The drive means 12 is a vertical pin which protrudes centrally from the base of the cooking chamber 11.

At the external side of the base of the container 2 is directly or indirectly associated a positioning block 13, able to be positioned in a seat 40 of a conjugate form, centrally provided on the base of the cooking chamber 11 from which the drive pin 12 centrally protrudes. The positioning block 14 has a central through hole for the crossing of the drive means 12.

The cooking chamber 11 is accessible from a door 30 positioned on the front side of the household appliance 1, where also the controls 31 are present for defining and starting the operating cycle of the household appliance 1.

In the cooking chamber 11 a container 10 can be seated, having at least a containment chamber 2 for the bread and at least a mixing shovel 3 positioned inside the containment chamber 2 and able to be directly or indirectly moved by the drive means 12.

The container 10 has a full capacity given by the sum of the capacity of each single containment chamber 2 present in it, ranging from 0.70 to 1.30 kg of bread.

Each shovel 3 has an ergonomic shape tapering towards the end and cooperating with vertical projections 18 of the lateral surface of the containment chamber 2 in order to facilitate the homogeneous mixing of the bread.

Each containment chamber 2 is advantageously configured in order to have a first proportion ratio R1 between every dimension A, B, Φ of its own base and its height H, and a second proportion ratio R2 between the dimension of its own height H and the length L of the shovel 3, being able to give to the bread, cooked directly in the same containment chamber 2 in which it is kneaded, a mainly low and wide shape with a little crumb.

Preferably, the first proportion ratio R1 is not lower than 1.8, whereas the second proportion ratio R2 is not greater than 2.

We refer to the solutions here described, in which the container 10 is provided with from one to four containment chambers 2 of a circular or quadrangular shape symmetrically disposed with reference to the vertical central axis of the container 10.

In the following, the identifiable parameters for each solution are shown.

Figure 2:
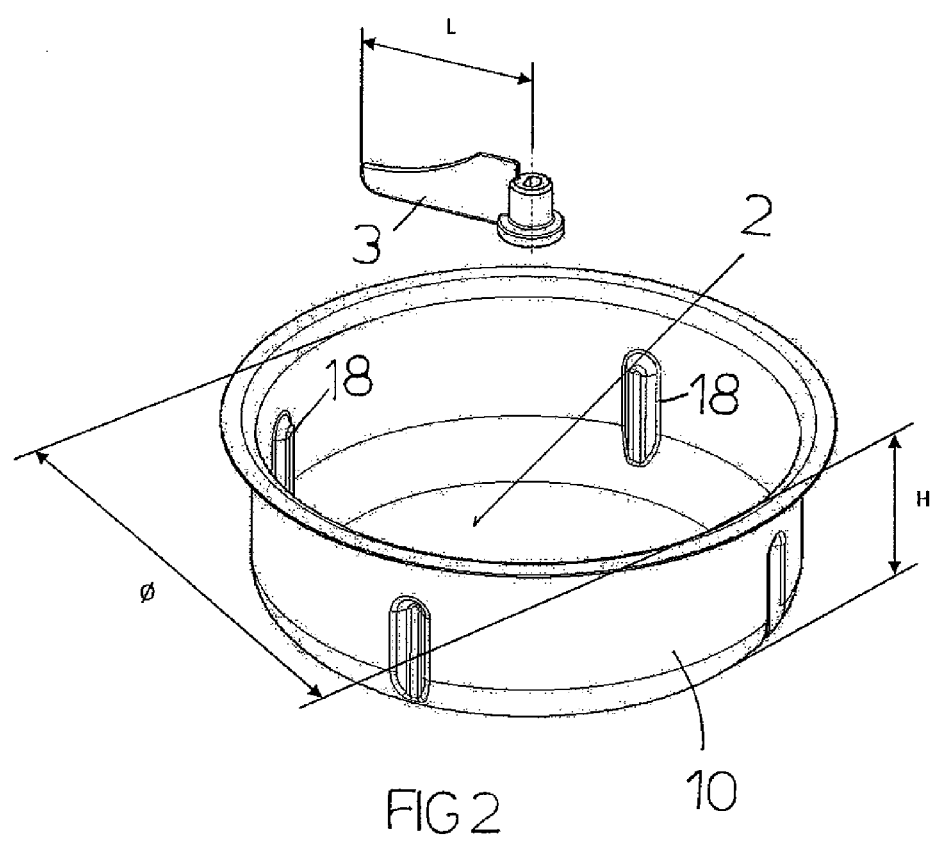
FIG. 2 shows a perspective view of the container for the bread with a single chamber according to a first preferred embodiment of the present invention.
Figure 3:
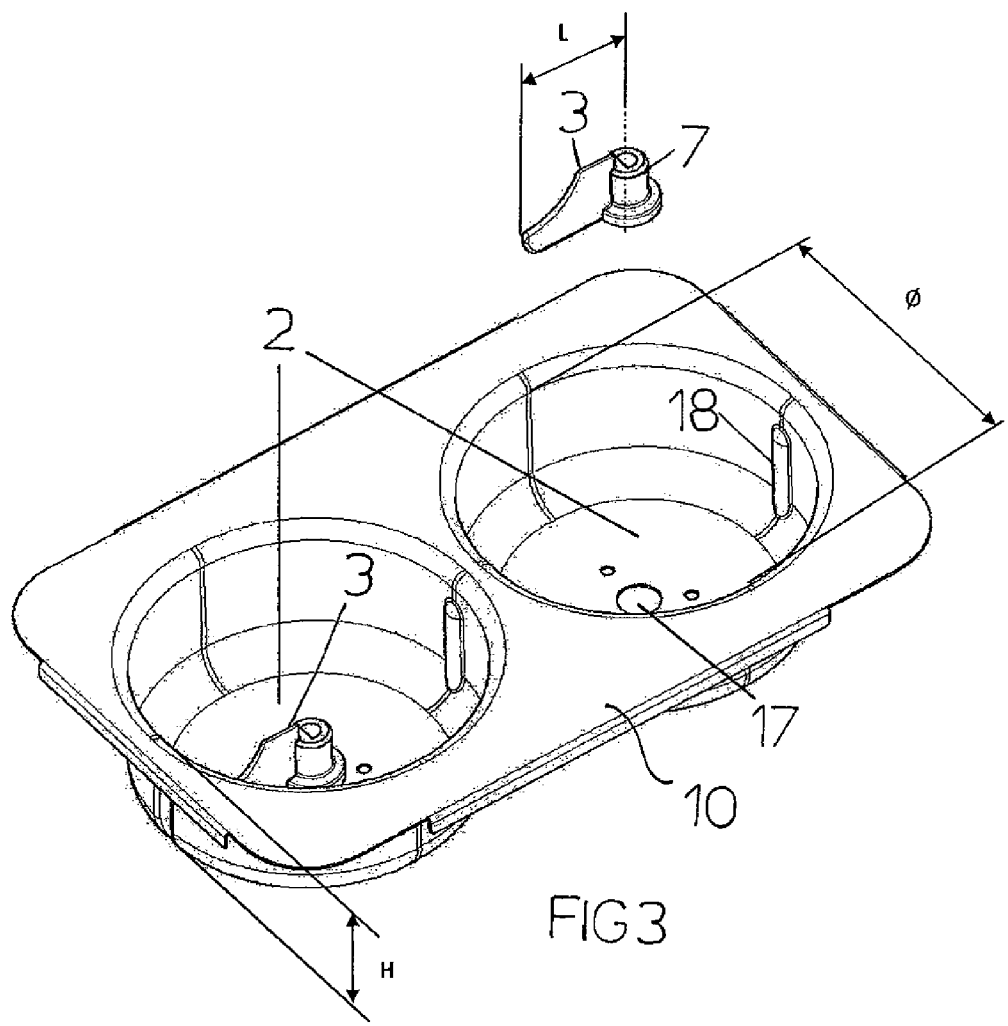
FIG. 3 shows a perspective view of a container for the bread with a double chamber according to a second preferred embodiment of the present invention.

|  | A (mm) | B (mm) | Φ (mm) | H (mm) | L (mm) | R1 (A/H B/H Φ/H) | R2 (H/L) |
|---|---|---|---|---|---|---|---|
| Container FIG. 2 (1 chamber) |  |  | 220 | 85 | 80 | 2.59 | 1.06 |
| Container FIG. 3 (2 chambers) |  | 140 |  | 70 | 50 | 2.00 | 1.40 |

-continued

Figure 4:
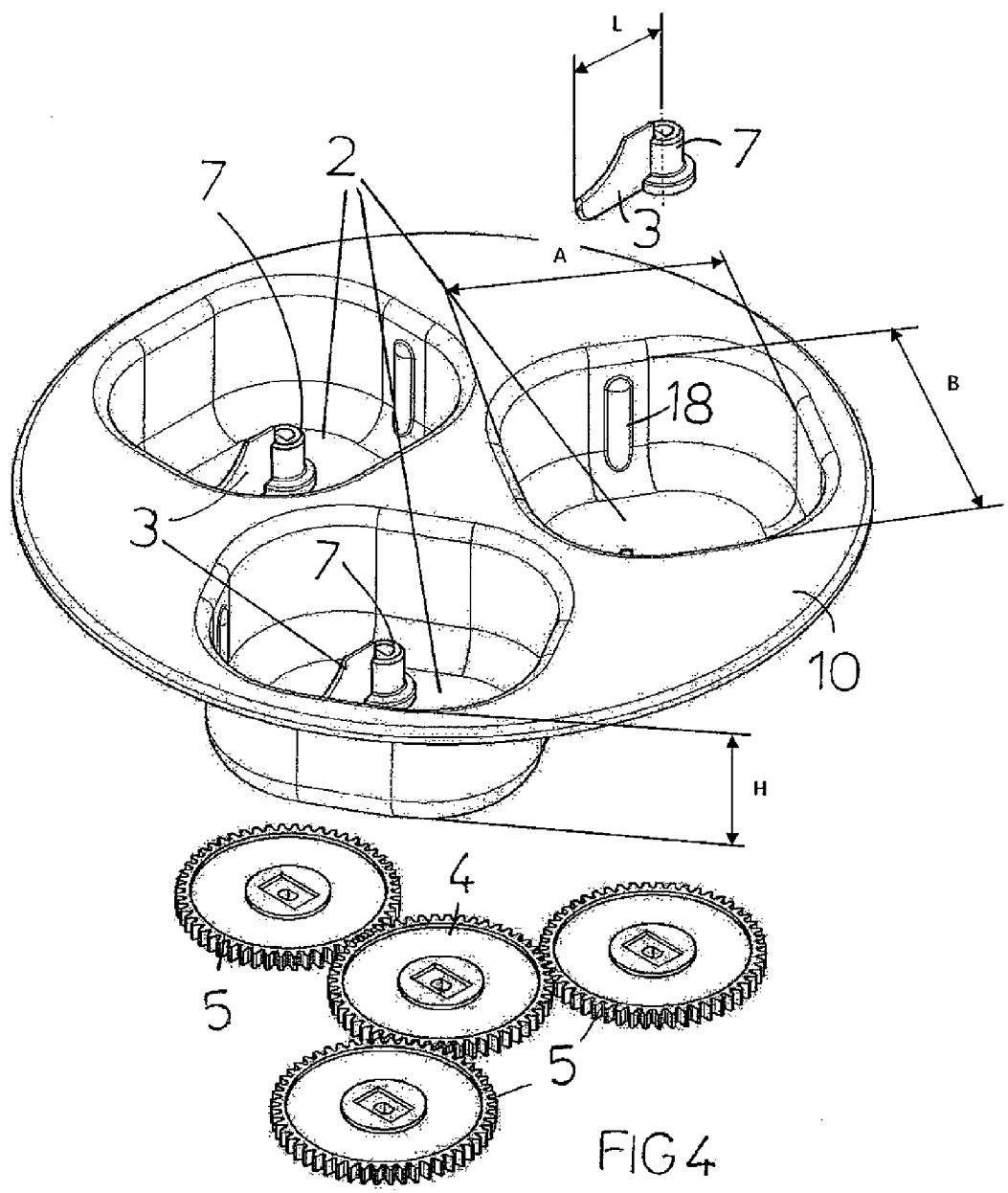
FIG. 4 shows a perspective view of a container for the bread with a triple chamber according to a third preferred embodiment of the present invention, and of the configuration of the mechanical transmission.
Figure 5:
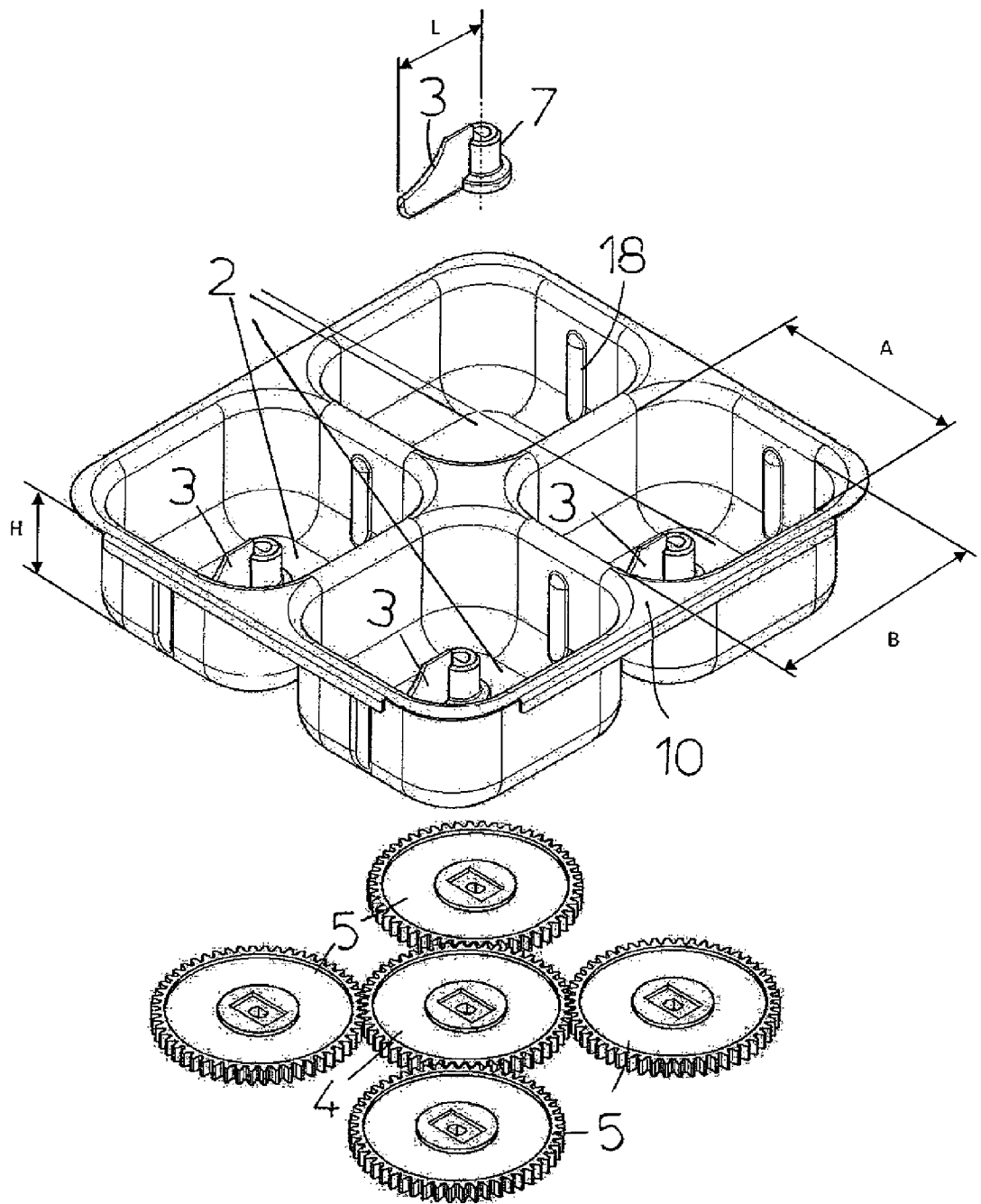
FIG. 5 shows a perspective exploded view of a container for the bread with a quadruple chamber according to a fourth preferred embodiment of the present invention, and of the configuration of the mechanical transmission.
Figure 6:
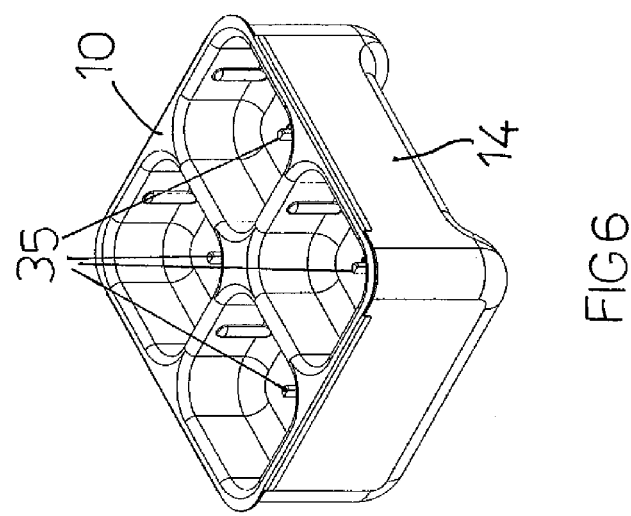
FIGS. 6 and 7 show a perspective assembled and exploded view of the container of FIG. 5 with the further container of the mechanical transmission.
Figure 7:
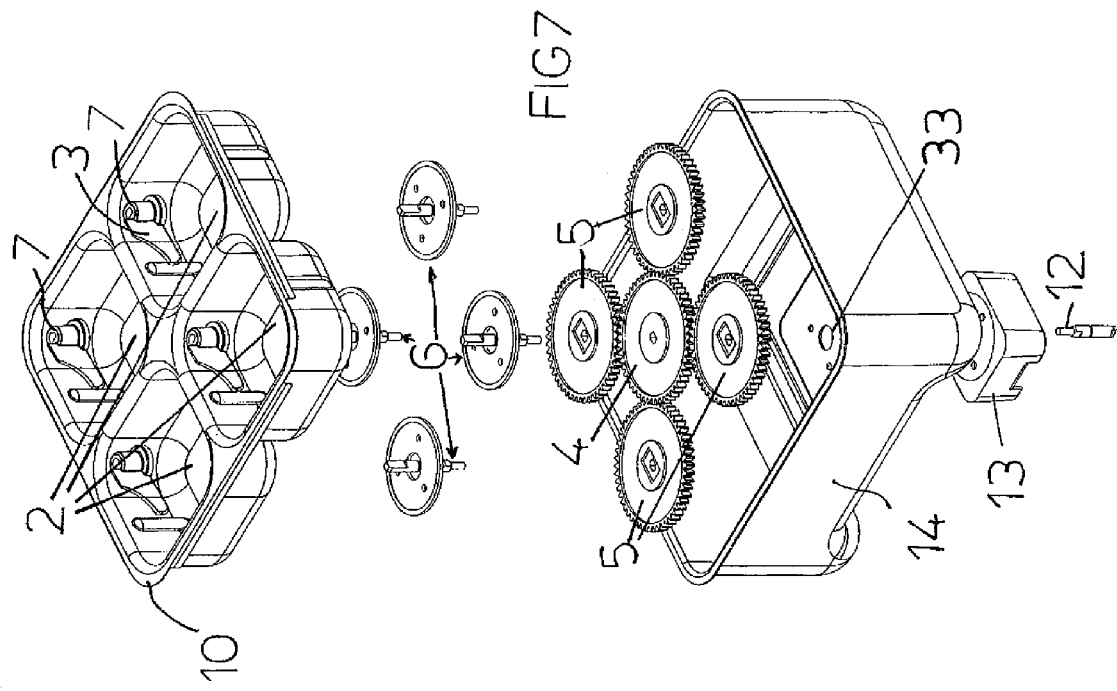

|  | A (mm) | B (mm) | Φ (mm) | H (mm) | L (mm) | R1 (A/H B/H Φ/H) | R2 (H/L) |
|---|---|---|---|---|---|---|---|
| Container FIG. 4 (3 chambers) | 124 | 138 |  | 65 | 50 | 1.91 2.12 | 1.30 |
| Container FIG. 5 (4 chambers) | 115 | 120 |  | 62 | 40 | 1.85 1.94 | 1.55 |

Furthermore, in all cases the shovel 3 has advantageously a length L not more than the height H of the containment chamber 2.

In the case where more containment chambers 2 are present in the container 10, a mechanical transmission is provided between the drive means 12 and the mixing shovels 3.

The mechanical transmission is positioned in the interstice between the outer side of the base of the container 10 and the inner side of the base of a further container 14 in which the container 10 is seated.

The base of the further container 14 has centrally a hole 33 for the crossing of the drive means 12.

The mechanical transmission comprises a drive geared wheel engageable on the drive means 12 and a plurality of driven gears 5 each of which carries centrally a mechanical axle 6 for engaging a hub 7 of a mixing shovel 3.

The driven gears 5 are peripheral and co-planar with the drive gear 4 with which they are meshing.

The drive gear 4 and the driven gears 5 lie in particular on a common horizontal plane.

Each mechanical axis 6 is oriented in a vertical direction and is positioned through a central hole 17 of the base of the upper containment chamber 2 from which it protrudes with an engaging end 35 of the hub 7 of the mixing shovel 3.

In the case of the container 10 with a single chamber (FIG. 2) through the central hole 17 of the base of the containment chamber 2 the drive means 12 protrudes directly.

The function of the household appliance according to the invention is evident from which was described and, particularly, is substantially the following.

In the case of a container 10 with a single containment chamber 2 (FIG. 2) the container 10 is positioned into the cooking chamber 11 by introducing the drive means 12 through the central hole 17 of the base of the container 10 in order to produce the engagement of the shovel 3 on the drive means 12 which thereafter, when it will begin to rotate during the operating cycle of the household appliance 1, will drive directly into rotation the shovel 3.

In the case of a container 3 with a multiple containment chamber 2 (FIGS. 3-7) the container 10 is positioned into the cooking chamber 11 by introducing the drive means 12 through the central hole 33 of the base of the further container 14 in order to produce the engagement of the control gear 4 on the drive means 12 which thereafter, when it will begin to rotate during the operating cycle of the household appliance 1, will indirectly drive into rotation all shovels 3 through the mechanical transmission above described.

The production cycle of the bread is completely automated, the kneading stage of the bread and the following cooking stage of the bread being performed in the same container 10.

The configuration of the container 10, and particularly of each single containment chamber 2 in relation also to the shovel 3, allows the production of bread with low and wide shapes with a little crumb.

The invention claimed is:

1. A household appliance (1) for the production of bread, comprising a cooking chamber (11), electrical supply means (19) for heating said cooking chamber (11), a drive means (12) pivotally activated in said cooking chamber (11) by a geared motor (13), a container (10) which can be accommodated in said cooking chamber (11) and having at least a containment chamber (2) for the bread and at least a mixing shovel (3) positioned inside said containment chamber (2) and able to be directly or indirectly moved by said drive means (12), said containment chamber (2) being so configured to have a first proportion ratio (R1) between every dimension (A, B, Φ) of its base and its height (H), said first proportion ratio (R1) being between 1.8 and 2.6, and a second proportion ratio (R2) between the dimension of its height (H) and the length (L) of said shovel (3), said second proportion ratio (R2) being between 1 and 2, said ratios being able to give to the cooked bread in said at least one containment chamber (2) a mainly low and wide shape with a little crumb, wherein the drive means (12) is a vertical pin which protrudes centrally from the base of the cooking chamber (11), the geared motor is disposed under the base of the cooking chamber, and an access to the interior of the cooking chamber is provided by a door (30) located at a wait of the cooking chamber other than the top wall and bottom wall.

2. The household appliance (1) for the production of bread as in claim 1, further comprising a mechanical transmission between said drive means (12} and the mixing shovels (3) provided in said container (10).

3. The household appliance (1) for the production of bread as in claim 2, characterized in that said mechanical transmission is positioned in the interstice between the external side of the base of said container (10) and the internal side of the base of a further container (14) in which said container (10) is housed.

4. The household appliance (1) for the production of bread as in claim 3, characterized in that the base of said further container (14) has a central hole (33) for the crossing of said drive means (12).

5. The household appliance (1) for the production of bread as in claim 1, characterized in that said mechanical transmission comprises a drive gear (4) that can be inserted on said drive means (12) and a plurality of driven gears (5), each of them carrying a central mechanical axis (6) for the insertion of a hub (7) of a mixing shovel (3).

6. The household appliance (1) for the production of bread as in claim 5, characterized in that said driven gears (5) are peripheral and co-planar with said drive gear (4) with which they are meshing.

7. The household appliance (1) for the production of bread as in claim 5, characterized in that said drive gear (4) and said driven gears (5) lie on a common horizontal plane, and each mechanical axis (6) is vertically oriented.

8. The household appliance (1) for the production of bread as in claim 5, characterized in that each mechanical axis (6) is positioned through a central hole (17) of the base of an upper containment chamber (2) from which it protrudes for the insertion of the hub (7) of the mixing shovel (3).

9. The household appliance (1) for the production of bread as in claim 1, characterized in that said heating means comprise a first and second electrical resistance positioned at the base and at the top of said cooking chamber.

10. The household appliance (1) for the production of bread as in claim 1, characterized in that said container (10) has from two to four containment chambers (2) of a circular or quadrangular shape symmetrically disposed with reference to the vertical central axis of said container (10).

11. The household appliance (1) for the production of bread as in claim 1, characterized in that the lateral surface of each containment chamber (2) has vertical projections (18) cooperating with said shovel (3), in order to facilitate the homogeneous mixing of the bread.

12. The household appliance (1) for the production of bread as in claim 1, characterized in that said shovel (3) has a length (L) not greater than the height (H) of said containment chamber (2).

13. The household appliance (1) for the production of bread as in claim 1, characterized in that said container (10) has a total capacity between 0.70 and 1.30 kg of bread.

* * * * *